US012291223B2

(12) United States Patent
Biess et al.

(10) Patent No.: US 12,291,223 B2
(45) Date of Patent: May 6, 2025

(54) VIRTUAL FIELDS DRIVING RELATED OPERATIONS

(71) Applicant: AUTOBRAINS TECHNOLOGIES LTD, Tel Aviv-Jaffa (IL)

(72) Inventors: Armin Biess, Yafo (IL); Isaac Misri, Yafo (IL); Julius Engelsoy, Yafo (IL); Igal Raichelgauz, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 0 days.

(21) Appl. No.: 18/350,684

(22) Filed: Jul. 11, 2023

(65) Prior Publication Data

US 2023/0347918 A1 Nov. 2, 2023

Related U.S. Application Data

(63) Continuation-in-part of application No. 17/823,069, filed on Aug. 29, 2022.

(Continued)

(51) Int. Cl.
*B60W 30/09* (2012.01)
*B60W 40/107* (2012.01)
(Continued)

(52) U.S. Cl.
CPC .......... *B60W 50/087* (2013.01); *B60W 30/09* (2013.01); *B60W 40/107* (2013.01);
(Continued)

(58) Field of Classification Search
CPC .. B60W 50/087; B60W 30/09; B60W 40/107; B60W 50/14; B60W 2540/18;
(Continued)

(56) References Cited

U.S. PATENT DOCUMENTS

2008/0097699 A1* 4/2008 Ono .................. B62D 15/0265
701/300
2009/0037052 A1* 2/2009 Ogasawara ............ G08G 1/167
701/41
(Continued)

FOREIGN PATENT DOCUMENTS

DE 102010045694 A1 * 3/2012 ............ B60W 30/09
JP 2007099237 A * 4/2007
(Continued)

OTHER PUBLICATIONS

Wahid et al., "Study on Potential Field Based Motion Planning and Control for Automated Vehicle Collision Avoidance Systems," in 2017 IEEE International Conference on Mechatronics: 208-213 (https://ieeexplore.ieee.org/abstract/document/7921105). (Year: 2017).*

(Continued)

*Primary Examiner* — Daniel M. Robert
(74) *Attorney, Agent, or Firm* — RECHES PATENTS

(57) ABSTRACT

A method for communicating with a driver of a vehicle, the method includes (i) obtaining object information regarding one or more objects located within an environment of the vehicle; (ii) analyzing the object information; (iii) determining, by using one or more neural network (NNs), and based on the object information, a virtual force associated with a physical model and representing an impact of the one or more objects on a behavior of the vehicle; and (iv) determining, based on at least the virtual force, a force feedback for use in providing a physical restraining force to be applied in association with a driver action made by the driver using the vehicle.

20 Claims, 11 Drawing Sheets

Related U.S. Application Data

(60) Provisional application No. 63/368,155, filed on Jul. 11, 2022, provisional application No. 63/260,839, filed on Sep. 1, 2021.

(51) Int. Cl.
  B60W 50/08 (2020.01)
  B60W 50/14 (2020.01)

(52) U.S. Cl.
  CPC ......... B60W 50/14 (2013.01); *B60W 2540/18* (2013.01); *B60W 2554/00* (2020.02); *B60W 2720/10* (2013.01); *B60W 2720/106* (2013.01)

(58) Field of Classification Search
  CPC ......... B60W 2554/00; B60W 2720/10; B60W 2720/106
  See application file for complete search history.

(56) References Cited

U.S. PATENT DOCUMENTS

| | | | | |
|---|---|---|---|---|
| 2010/0228438 | A1* | 9/2010 | Buerkle | B62D 15/025 701/41 |
| 2016/0052547 | A1* | 2/2016 | Kashiwai | B62D 15/021 701/41 |
| 2017/0066475 | A1* | 3/2017 | Kudo | B62D 15/025 |
| 2017/0291602 | A1* | 10/2017 | Newman | B60W 50/14 |
| 2018/0050673 | A1* | 2/2018 | D'sa | B60T 8/58 |
| 2019/0291726 | A1* | 9/2019 | Shalev-Shwartz | B60W 10/06 |
| 2020/0353918 | A1* | 11/2020 | Goto | B60W 30/095 |
| 2021/0061350 | A1* | 3/2021 | Kinoshita | B60W 30/09 |
| 2021/0291820 | A1* | 9/2021 | Inoue | B60W 30/09 |
| 2022/0161787 | A1* | 5/2022 | Kinoshita | G06V 20/58 |

FOREIGN PATENT DOCUMENTS

| | | | | | |
|---|---|---|---|---|---|
| JP | 2009051430 | A | * | 3/2009 | |
| JP | 2011070686 | A | * | 4/2011 | ........... B60K 26/021 |
| JP | 2017182563 | A | * | 10/2017 | |
| JP | 2018192954 | A | * | 12/2018 | |
| JP | 2019028524 | A | * | 2/2019 | |

OTHER PUBLICATIONS

Yin et al., "A new potential field method for mobile robot path planning in the dynamic environments," Asian Journal of Control 11, No. 2 (2009): 214-225. (Year: 2009).*

Gerdes and E. J. Rossetter, "A unified approach to driver assistance systems based on artificial potential fields," Journal of Dynamic Systems, Measurement, and Control 123, No. 3 (2001): 431-438. (Year: 2001).*

* cited by examiner

```
┌─────────────────────────────────────────────────────────┐
│ Collecting human data taken to be expert demonstrations for │
│            how to handle the scenario 210               │
└─────────────────────────────────────────────────────────┘
                            │
                            ▼
┌─────────────────────────────────────────────────────────┐
│  Constructing a loss function that punishes the difference │
│  between a kinematic variable resulting from the perception │
│  field model and the corresponding kinematic variable of the │
│                  human demonstrations 220               │
└─────────────────────────────────────────────────────────┘
                            │
                            ▼
┌─────────────────────────────────────────────────────────┐
│  Updating parameters of the perception field and auxiliary │
│   functions to minimize the loss function by means of some │
│      optimization algorithm such as gradient descent 230 │
└─────────────────────────────────────────────────────────┘
```

```
┌─────────────────────────────────────────────────────┐
│   Detecting closest lane or side of road sample     │
│ points (X_{L,i}, Y_{L,i}) and (X_{R,i}, Y_{R,i}) where L is left, R is │
│ right and index I refers to the sample points. 610  │
└─────────────────────────────────────────────────────┘
                           │
                           ▼
┌─────────────────────────────────────────────────────┐
│ Concatenating left lane input vectors(X_{L,i}, Y_{L,i}) and │
│   V_{ego} into X_L and concatenating right lane input │
│       vectors(X_{R,i}, Y_{R,i}) and V_{ego} into X_R. 620 │
└─────────────────────────────────────────────────────┘
                           │
                           ▼
┌─────────────────────────────────────────────────────┐
│   Calculating lane perception fields f_θ(X_L) and f_θ(X_R). │
│      This is done by one or more NNs. 630           │
└─────────────────────────────────────────────────────┘
                           │
                           ▼
┌─────────────────────────────────────────────────────┐
│ Constructing a differential equation that describes │
│    ego acceleration applied on the ego vehicle: a = │
│              f_θ(X_L) + f_θ(X_R)  640               │
└─────────────────────────────────────────────────────┘
                           │
                           ▼
┌─────────────────────────────────────────────────────┐
│  Applying RL to evaluate the perception fields by   │
│    implementing the acceleration in a simulated     │
│     environment and evaluating the outcome - for    │
│     example by applying a reward function. The      │
│   evaluating may include determining to update the  │
│  perception fields -- by updating the weights of the│
│              one or more NNs  670                   │
└─────────────────────────────────────────────────────┘

```
┌─────────────────────────────────────────────────────────────┐
│ Receiving a sequence of panoptically segmented images over  │
│ short time window from ego perspective (images obtained by  │
│  the ego vehicle), relative distance to individual objects  │
│                     $X_{rel,I}$ 710                         │
└─────────────────────────────────────────────────────────────┘
                              │
                              ▼
┌─────────────────────────────────────────────────────────────┐
│   Applying spatio-temporal CNN to individual instances      │
│ (objects) to capture high-level spatio-temporal features $X_i$.│
│                          720                                │
└─────────────────────────────────────────────────────────────┘
                              │
                              ▼
┌─────────────────────────────────────────────────────────────┐
│    Computing individual perception fields $f_\theta(X_i,i)$ and sum │
│                  $\Sigma f_\theta(X_{rel,I}, X_i, i)$  730                 │
└─────────────────────────────────────────────────────────────┘
                              │
                              ▼
┌─────────────────────────────────────────────────────────────┐
│   Constructing a differential equation that describes ego   │
│ acceleration applied on the ego vehicle: $a = \Sigma f_\theta(X_{rel,I}, X_i, i)$. │
│                          740                                │
└─────────────────────────────────────────────────────────────┘
                              ┆
                              ▼
┌─────────────────────────────────────────────────────────────┐
│Applying RL to evaluate the perception fields by implementing│
│  the acceleration in a simulated environment and evaluating │
│  the outcome – for example by applying a reward function. The│
│  evaluating may include determining to update the perception│
│   fields – by updating the weights of the one or more NNs 770│
└─────────────────────────────────────────────────────────────┘
```

Receiving a location of the ego vehicle $X_{ego}$, the speed of the ego vehicle $V_{ego}$, the location of the nearest vehicle in front of the ego vehicle $X_{CIPV}$, and the speed of the nearest vehicle in front of the ego vehicle $V_{CIPV}$ 910

↓

Calculating the relative location $X_{rel} = X_{ego} - X_{CIPV}$, and the and the relative speed $V_{rel} = V_{ego} - V_{CIPV}$. 920

↓

Calculating, by a first NN, a perception field function $g_\theta(X_{rel}, V_{CIPV})$. Calculating, by a second NN, an auxiliary function $h_\psi(V_{rel})$. Multiplying $g_\theta(X_{rel}, V_{CIPV})$ by $h_\psi(V_{rel})$ to provide a target acceleration (which equals the target force) 930

Computing ego trajectory given initial conditions $(t; x_0, v_0)$ 960

↓

Computing a loss function = $\Sigma((t;x_0,v_0)) - x(t;x_0,v_0))^2$ 970

VIRTUAL FIELDS DRIVING RELATED OPERATIONS

CROSS REFERENCE

This application is a continuation in part of U.S. patent application Ser. No. 17/823,069 filing date Aug. 29 2022, that claims priority from US provisional application 63/260,839 which is incorporated herein by reference. This application claims priority from U.S. provisional patent Ser. No. 63/368,155 filing date Jul. 11, 2022 which is incorporated herein in its entirety.

BACKGROUND

Autonomous vehicles (AVs) could help vastly reduce the number of traffic accidents and $CO_2$ emissions as well as contribute to a more efficient transportation system. However, today's candidate AV technologies are not scalable in the following three ways:

Limited field of view, lighting and weather challenges, and occlusions all lead to detection error and noisy localization/kinematics. In order to deal with such poor real-world perception output, one approach to AV technology is to invest in expensive sensors and/or to integrate specialized infrastructure into the road network. However, such an endeavor is very costly and—in the case of infrastructure—geographically limited, and therefore cannot lead to generally accessible AV technology.

AV technology which is not based on costly hardware and infrastructure relies entirely on machine learning and hence data to handle real-world situations. In order to deal with detection error as well as to learn a good enough driving policy for the complex task of driving, a vast amount of data and computational resources are required and still there are edge cases that are not handled correctly. The common denominator in these edge cases is that the machine learning model does not generalize well to unseen or confusing situations and due to the black-box nature of deep neural networks it is difficult to analyze faulty behavior.

Current road-ready automated driving is implemented in the form of separate ADAS functions such as ACC, AEB, and LCA. To arrive at fully autonomous driving would require seamlessly joining existing ADAS functions together as well as covering any currently non-automated gaps by adding more such functions (e.g. lane change, intersection handling etc.). In short, current automated driving is not based on a holistic approach that can readily be extended to produce full autonomous driving.

BRIEF DESCRIPTION OF THE DRAWINGS

The embodiments of the disclosure will be understood and appreciated more fully from the following detailed description, taken in conjunction with the drawings in which:

FIG. 2 illustrates an example of a method;
FIGS. 6-9 illustrate examples of situations and of perception fields.

DESCRIPTION OF EXAMPLE EMBODIMENTS

Figure 1:
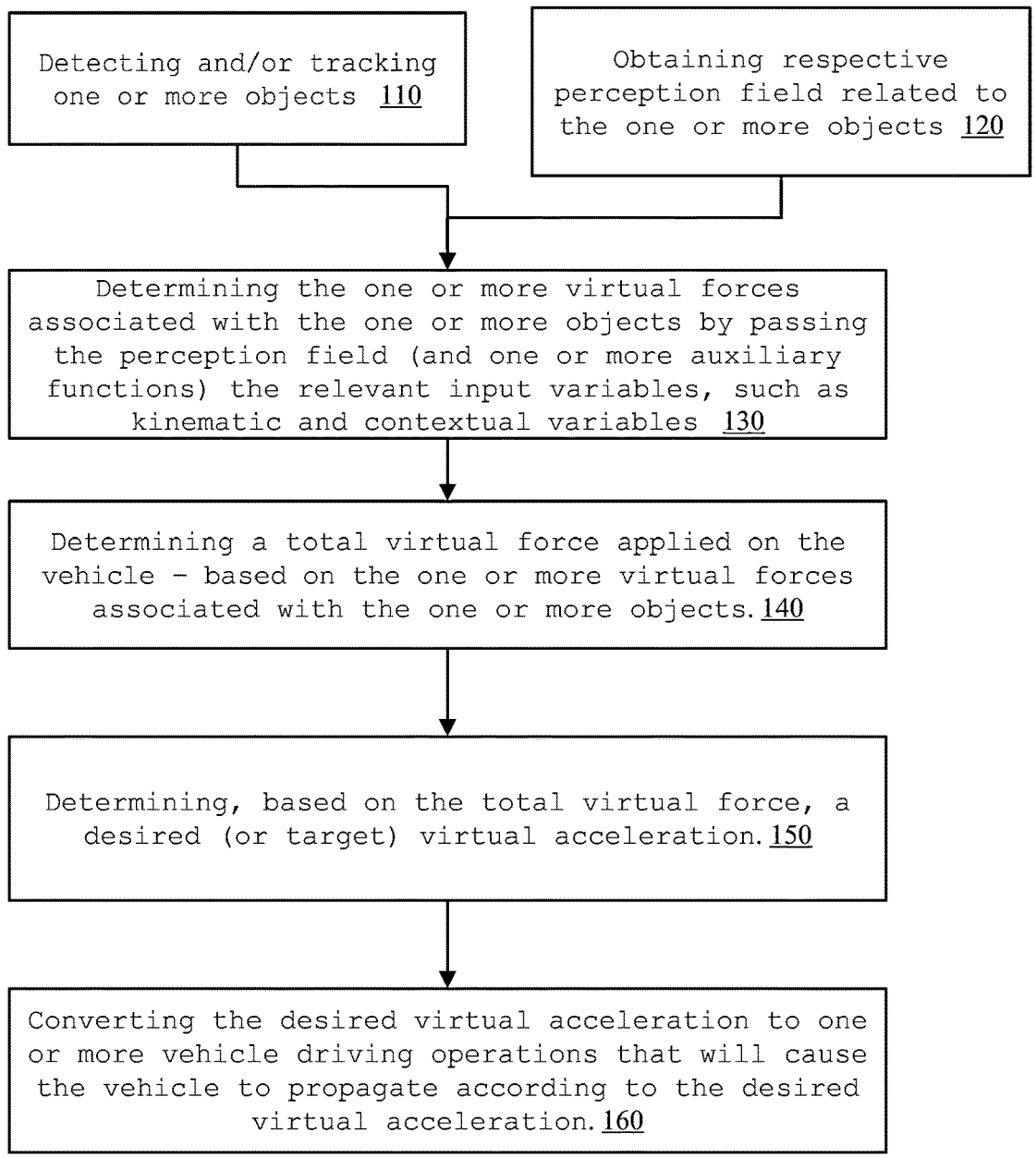
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the units and/or modules that are illustrated in the application, may be implemented in hardware and/or code, instructions and/or commands stored in a non-transitory computer readable medium, may be included in a vehicle, outside a vehicle, in a mobile device, in a server, and the like.

The vehicle may be any type of vehicle that a ground transportation vehicle, an airborne vehicle, and a water vessel.

The specification and/or drawings may refer to an image. An image is an example of a media unit. Any reference to an image may be applied mutatis mutandis to a media unit. A media unit may be an example of sensed information unit (SIU). Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to a sensed information unit (SIU). The SIU may be of any kind and may be sensed by any type of sensors-such as a visual light camera, an audio sensor, a sensor that may sense infrared, radar imagery, ultrasound, electro-optics, radiography, LIDAR (light detection and ranging), a thermal sensor, a passive sensor, an active sensor, etc. The sensing may include generating samples (for example, pixel, audio signals) that represent the signal that was transmitted, or otherwise reach the sensor. The SIU may be one or more images, one or more video clips, textual information regarding the one or more images, text describing kinematic information about an object, and the like.

Object information may include any type of information related to an object such as but not limited to a location of the object, a behavior of the object, a velocity of the object, an acceleration of the object, a direction of a propagation of the object, a type of the object, one or more dimensions of the object, and the like. The object information may be a raw SIU, a processed SIU, text information, information derived from the SIU, and the like.

An obtaining of object information may include receiving the object information, generating the object information, participating in a processing of the object information, processing only a part of the object information and/or receiving only another part of the object information.

The obtaining of the object information may include object detection or may be executed without performing object detection.

A processing of the object information may include at least one out of object detection, noise reduction, improvement of signal to noise ratio, defining bounding boxes, and the like.

The object information may be received from one or more sources such as one or more sensors, one or more communication units, one or more memory units, one or more image processors, and the like.

The object information may be provided in one or more manners—for example in an absolute manner (for example—providing the coordinates of a location of an object), or in a relative manner—for example in relation to a vehicle (for example the object is located at a certain distance and at a certain angle in relation to the vehicle.

The vehicle is also referred to as an ego-vehicle.

The specification and/or drawings may refer to a processor or to a processing circuitry. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly—any reference to object detection is applicable mutatis mutandis to a pattern detection.

Although successful driving is contingent upon circumnavigating surrounding road objects based on their location and movement, humans are notoriously bad at estimating kinematics. We suspect that humans employ an internal representation of surrounding objects in the form of virtual force fields that immediately imply action, thus circumventing the need for kinematics estimation. Consider a scenario in which the ego vehicle drives in one lane and a vehicle diagonally in front in an adjacent lane starts swerving into the ego lane. The human response to brake or veer off would be immediate and instinctive and can be experienced as a virtual force repelling the ego from the swerving vehicle. This virtual force representation is learned and associated with the specific road object.

Inspired by the above considerations we propose the novel concept of perception fields. Perception fields are a learned representation of road objects in the form of a virtual force field that is "sensed" through the control system of the ego vehicle in the form of ADAS and/or AV software. A field is here defined as a mathematical function which depends on spatial position (or an analogous quantity).

An example of an inference method 100 is illustrates in FIG. 1 and include:

Method 100 may be executed per one or more frames of an environment of the vehicle.

Step 110 of method 100 may include detecting and/or tracking one or more objects (including, for example, one or more road users). The detecting and/or tracking may be done in any manner. The one or more objects may be any object that may affect the behavior of the vehicle. For example—a road user (pedestrian, another vehicle), the road and/or path on which the vehicle is progressing (for example the state of the road or path, the shape of the road—for example a curve, a straight road segments), traffic signs, traffic light, road crossings, a school, a kindergarten, and the like. Step 110 may include obtaining additional information such as kinematic and contextual variables related to the one or more objects. The obtaining may include receiving or generating. The obtaining may include processing the one or more frames to generate the kinematic and contextual variables.

It should be noted that step 110 may include obtaining the kinematic variables (even without obtaining the one or more frames).

Method 100 may also include step 120 of obtaining respective perception field related to the one or more objects. Step 120 may include determining which mapping between objects and should be retrieved and/or used, and the like.

Step 110 (and even step 120) may be followed by step 130 of determining the one or more virtual forces associated with the one or more objects by passing the perception field (and one or more virtual physical model functions) the relevant input variables, such as kinematic and contextual variables.

Step 130 may be followed by step 140 of determining a total virtual force applied on the vehicle—based on the one or more virtual forces associated with the one or more objects. For example—step 140 may include performing a vector weighted sum (or other function) on the one or more virtual forces associated with the one or more objects.

Step 140 may be followed by step 150 of determining, based on the total virtual force, a desired (or target) virtual acceleration—for example based on the equivalent of Newton's second law. The desired virtual acceleration may be a vector—or otherwise have a direction.

Step 150 may be followed by step 160 of converting the desired virtual acceleration to one or more vehicle driving operations that will cause the vehicle to propagate according to the desired virtual acceleration.

For example—step 160 may include translating the desired acceleration to acceleration or deceleration or changing direction of progress of the vehicle—using gas pedal movement, brake pedal movement and/or steering wheel angle. The translation may be based on a dynamics model of the vehicle with a certain control scheme.

The advantages of perception fields are include, for example—explainability, generalizability a and robustness to noisy input.

Explainability. Representing ego movement as the composition of individual perception fields implies decomposing actions into more fundamental components and is in itself a significant step towards explainability. The possibility to visualize these fields and to apply intuition from physics in order to predict ego motion represent further explainability as compared to common end-to-end, black-box deep learning approaches. This increased transparency also leads to passengers and drivers being able to trust AV or ADAS technology more.

Generalizability. Representing ego reactions to unknown road objects as repellent virtual force fields constitutes an inductive bias in unseen situations. There is a potential advantage to this representation in that it can handle edge cases in a safe way with less training. Furthermore, the perception field model is holistic in the sense that the same approach can be used for all aspects of the driving policy. It can also be divided into narrow driving functions to be used in ADAS such as ACC, AEB, LCA etc. Lastly, the composite nature of perception fields allows the model to be trained on atomic scenarios and still be able to properly handle more complicated scenarios.

Robustness to noisy input: Physical constraints on the time evolution of perception fields in combination with potential filtering of inputs may lead to better handling of noise in the input data as compared to pure filtering of localization and kinematic data.

Physical or virtual forces allow for a mathematical formulation—for example—in terms of a second order ordinary differential equation comprising a so called dynamical system. The benefits of representing a control policy as such is that it is susceptible to intuition from the theory of dynamical systems and it is a simple matter to incorporate external modules such as prediction, navigation, and filtering of in-puts/outputs.

An additional benefit to the perception field approach is that it is not dependent on any specific hardware, and not computationally more expensive than existing methods.
Training Process The process for learning perception fields can be of one of two types or a combination thereof, namely behavioral cloning (BC) and reinforcement learning (RL). BC approximates the control policy by fitting a neural network to observed human state-action pairs whereas RL entails learning by trial and error in a simulation environment without reference to expert demonstrations.

One can combine these two classes of learning algorithms by first learning a policy through BC to use it as an initial policy to be fine-tuned using RL. Another way to combine the two approaches is to first learn the so called reward function (to be used in RL) through behavioral cloning to infer what constitutes desirable behavior to humans, and later to train through trial and error using regular RL. This latter approach goes under the name of inverse RL (IRL).

FIG. 2 is an example of a training method 200 employed for learning through BC.

Method 200 may start by step 210 of collecting human data taken to be expert demonstrations for how to handle the scenario.

Step 210 may be followed by step 220 of constructing a loss function that punishes the difference between a kinematic variable resulting from the perception field model and the corresponding kinematic variable of the human demonstrations.

Step 220 may be followed by step 230 of updating parameters of the perception field and auxiliary functions (that may be virtual physical model functions that differ from perception fields) to minimize the loss function by means of some optimization algorithm such as gradient descent.

Figure 3:
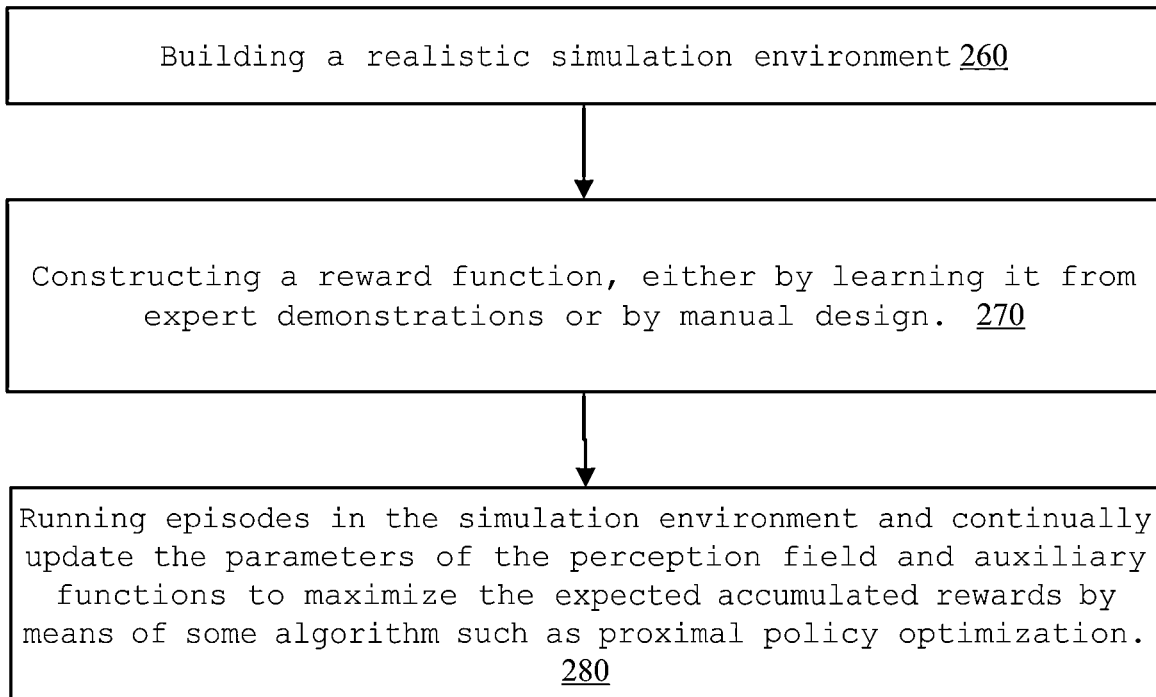
FIG. 3 illustrates an example of a method.

FIG. 3 is an example of a training method 250 employed for reinforcement learning.

Method 250 may start by step 260 of building a realistic simulation environment.

Step 260 may be followed by step 270 of constructing a reward function, either by learning it from expert demonstrations or by manual design.

Step 270 may be followed by step 280 of running episodes in the simulation environment and continually update the parameters of the perception field and auxiliary functions to maximize the expected accumulated rewards by means of some algorithm such as proximal policy optimization.

Figure 4:
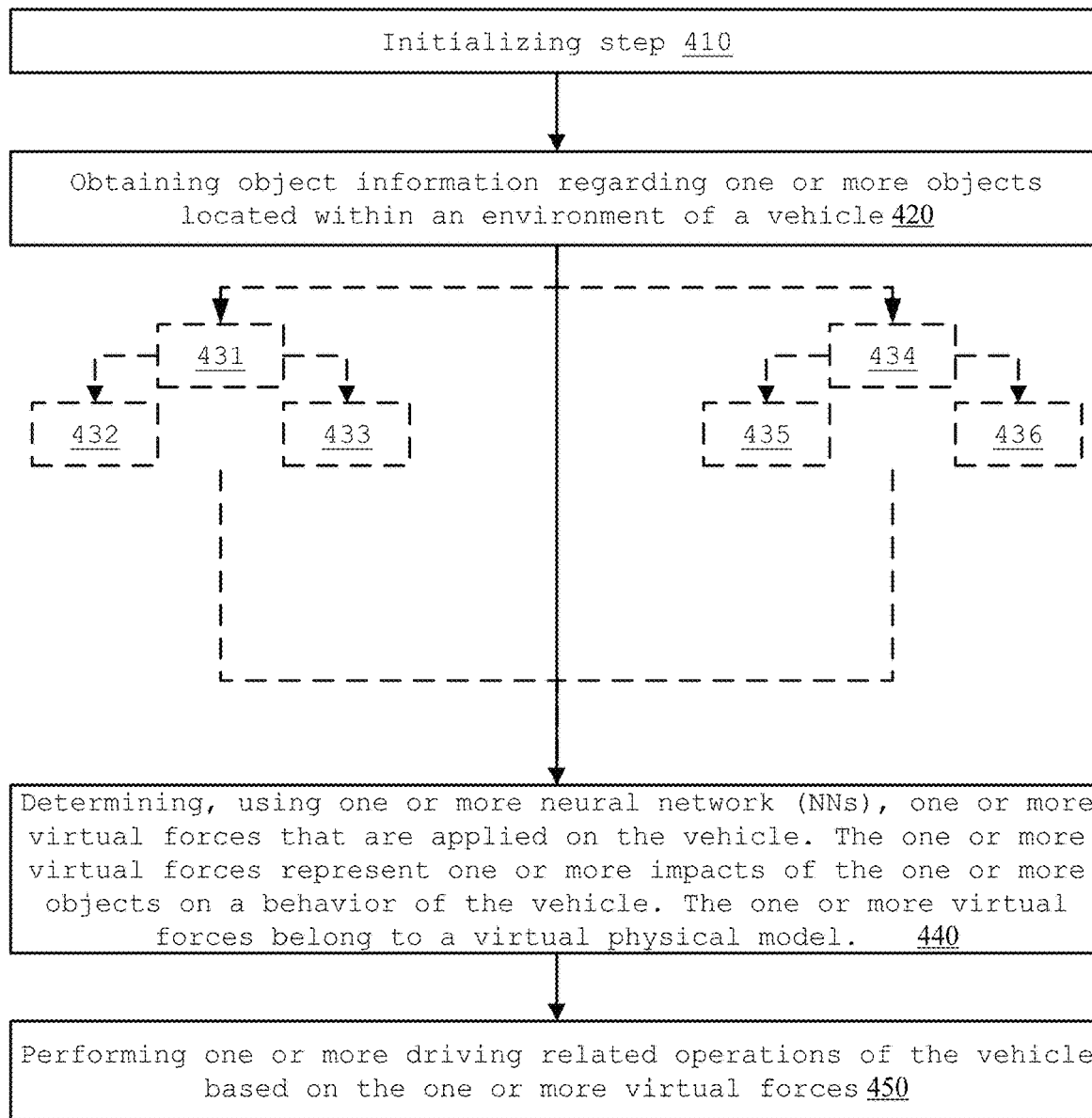
FIG. 4 illustrates an example of a method.

FIG. 4 illustrates an example of method 400.

Method 400 may be for perception fields driving related operations.

Method 400 may start by initializing step 410.

Initializing step 410 may include receiving a group of NNs that are trained to execute step 440 of method 400.

Alternatively, step 410 may include training a group of NNs that to execute step 440 of method 400.

Various example of training the group of NNs are provided below.

The group of NNs may be trained to map the object information to the one or more virtual forces using behavioral cloning.

The group of NNs may be trained to map the object information to the one or more virtual forces using reinforcement learning.

The group of NNs may be trained to map the object information to the one or more virtual forces using a combination of reinforcement learning and behavioral cloning.

The group of NNs may be trained to map the object information to the one or more virtual forces using a reinforcement learning that has a reward function that is defined using behavioral cloning.

The group of NNs may be trained to map the object information to the one or more virtual forces using a reinforcement learning that has an initial policy that is defined using behavioral cloning.

The group of NNs may be trained to map the object information to the one or more virtual forces and one or more virtual physical model functions that differ from the perception fields.

The group of NN may include a first NN and a second NN, wherein the first NN is trained to map the object information to the one or more perception fields and the second NN was trained to map the object information to the one or more virtual physical model functions.

Initializing step 410 may be followed by step 420 of obtaining object information regarding one or more objects located within an environment of a vehicle. Step 410 may be repeated multiple times—and the following steps may also repeated multiple times. The object information may include video, images, audio, or any other sensed information.

Step 420 may be followed by step 440 of determining, using one or more neural network (NNs), one or more virtual forces that are applied on the vehicle.

The one or more NNs may be the entire group of NNs (from initialization step 410) or may be only a part of the group of NNs-leaving one or more non-selected NNs of the group.

The one or more virtual forces represent one or more impacts of the one or more objects on a behavior of the vehicle. The impact may be a future impact or a current impact. The impact may cause the vehicle to change its progress.

The one or more virtual forces belong to a virtual physical model. The virtual physical model is a virtual model that may virtually apply rules of physics (for example mechanical rules, electromagnetic rules, optical rules) on the vehicle and/or the objects.

Step 440 may include at least one of the following steps:
Calculating, based on the one or more virtual forces applied on the vehicle, a total virtual force that is applied on the vehicle.
Determining a desired virtual acceleration of the vehicle based on an total virtual acceleration that is applied on the vehicle by the total virtual force. The desired virtual acceleration may equal the total virtual acceleration—or may differ from it.

Method 400 may also include at least one of step 431, 432, 433, 434, 435 and 436.

Step 431 may include determining a situation of the vehicle, based on the object information.

Step 431 may be followed by step 432 of selecting the one or more NNs based on the situation.

Additionally or alternatively, step 431 may be followed by step 433 of feeding the one or more NNs with situation metadata.

Step 434 may include detecting a class of each one of the one or more objects, based on the object information.

Step 434 may be followed by step 435 of selecting the one or more NNs based on a class of at least one object of the one or more objects.

Additionally or alternatively, step 434 may be followed by step 436 of feeding the one or more NNs with class metadata indicative of a class of at least one object of the one or more objects.

Step 440 may be followed by step 450 of performing one or more driving related operations of the vehicle based on the one or more virtual forces.

Step 450 may be executed without human driver intervention and may include changing the speed and/or acceleration and/or the direction of progress of the vehicle. This may include performing autonomous driving or performing advanced driver assistance system (ADAS) driving operations that may include momentarily taking control over the vehicle and/or over one or more driving related unit of the vehicle. This may include setting, without or without human driver involvement, an acceleration of the vehicle to the desired virtual acceleration.

Step 440 may include suggesting to a driver to set an acceleration of the vehicle to the desired virtual acceleration.

Figure 5:
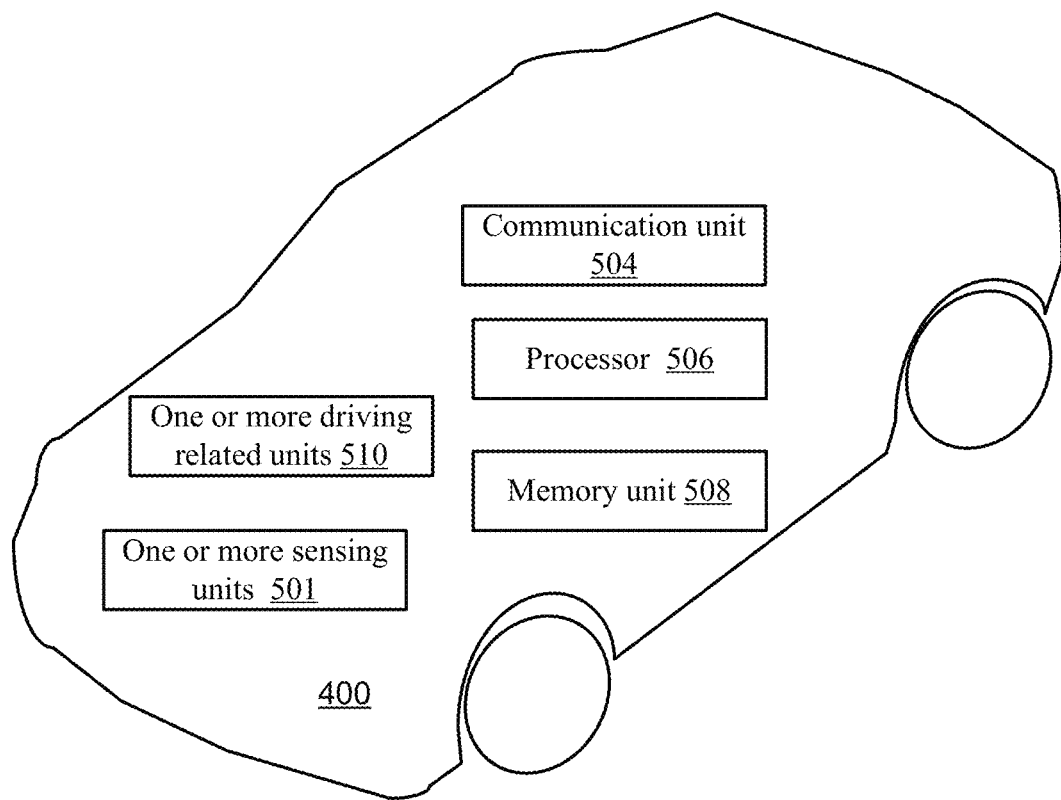
FIG. 5 is an example of a vehicle.

FIG. 5 is an example of a vehicle. The vehicle may include one or more sensing units 501, one or more driving related units 510 (such as autonomous driving units, ADAS units, and the like, a processor 560 configured to execute any of the methods, a memory unit 508 for storing instructions and/or method results, functions and the like, and a communication unit 504.

FIG. 6 illustrate examples of a method 600 for lane centering RL with lane sample points as inputs. The lane sample points are located within the environment of the vehicle.

The RL assumes a simulation environment that generated input data in which an agent (ego vehicle) can implement its learned policy (perception fields).

Method 600 may start by step 610 of detecting closest lane or side of road sample points $(X_{L,i}, Y_{L,i})$ and $(X_{R,i}, Y_{R,i})$ where L is left, R is right and index i refers to the sample points. The velocity of the ego vehicle (previously referred to as the vehicle) is denoted $V_{ego}$.

Step 610 may be followed by step 620 of concentrating left lane input vectors $(X_{L,i}, Y_{L,i})$ and $V_{ego}$ into $X_L$ and concentrating right lane input vectors $(X_{R,i}, Y_{R,i})$ and $V_{ego}$ into $X_R$.

Step 620 may be followed by step 630 of calculating lane perception fields $f_\theta(X_L)$ and $f\theta(X_R)$. This is done by one or more NNs.

Step 630 may be followed by step 640 of constructing a differential equation that describes ego acceleration applied on the ego vehicle: $a=f_\theta(X_L)+f\theta(X_R)$.

This may be the output of the inference process. Step 640 may be followed by step 450 (not shown).

The method may include updating the one or more NNs. In this case the RL may assume a reward function that is either learnt based on expert demonstrations or handcrafted), in the example of FIG. 6 the reward function may increase for every timestamp in which the ego vehicle maintains its lane.

The updating may include step 670 of implementing, in a simulation environment and the RL learning algorithm records what happens in the next time step including the obtaining reward.

Step 670 may include using a specific RL algorithm (for example PPO, SAC, TTD3 to sequentially update the network parameters e in order to maximize average award.

FIG. 7 illustrates method 700 for multi-object RL with visual input.

Step 710 of method 700 may include receiving a sequence of panoptically segmented images over short time window from ego perspective (images obtained by the ego vehicle), relative distance to individual objects $X_{rel,i}$.

Step 710 may be followed by step 720 of applying spatio-temporal CNN to individual instances (objects) to capture high-level spatio-temporal features $X_i$.

Step 720 may be followed by step 730 of computing individual perception fields $f\theta(X_i, i)$ and sum $\Sigma f\theta(X_{rel,i}, X_i, i)$.

Step 730 may be followed by step 740 of constructing a differential equation that describes ego acceleration applied on the ego vehicle: $a=\Sigma f\theta(X_{rel,i}, X_i, i)$.

This may be the output of the inference process. Step 740 may be followed by step 450 (not shown).

The method may include updating the one or more network parameters θ using some RL process.

The method may include step 760 of implementing a in the simulation environment and the RL learning algorithm records what happens in the next time step, including the obtained reward.

The RL may assume a reward function that is either learned based on expert demonstrations or handcrafted.

Step 760 may be followed by step 770 of using specific RL algorithm such as PPO, SAC, TTD3 to sequentially update the network parameters e in order to maximize average reward.

Figure 8:
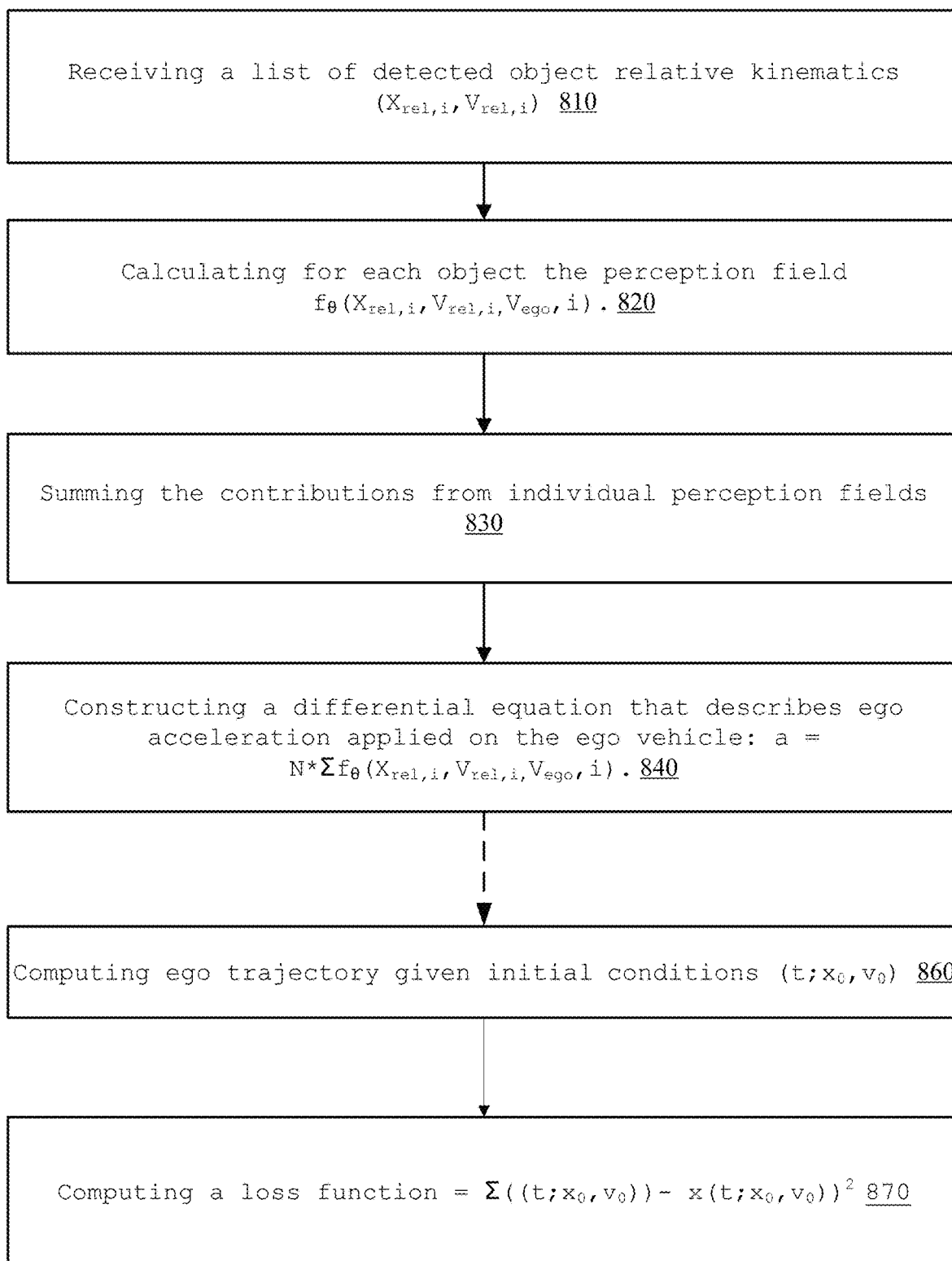

FIG. 8 illustrates method 800 for multi-object BC with kinematics input.

Step 810 of method 800 may include receiving a list of detected object relative kinematics $(X_{rel,i}, V_{rel,i})$ wherein $X_{rel,i}$ is a relative location of detected object i-in relation to the ego vehicle and $V_{rel,i}$ is a relative velocity of detected object i-in relation to the ego vehicle. Also receiving the ego vehicle velocity $V_{ego}$.

Step 810 may be followed by step 820 of calculating for each object the perception field $f\theta(X_{rel,i}, V_{rel,i}, V_{ego}, i)$.

Step 820 may be followed by step 830 of summing the contributions from individual perception fields. Step 830 may also include normalizing so that the magnitude of the resulting 2d vector is equal to the highest magnitude of the individual terms: $N*\Sigma f\theta(X_{rel,i}, V_{rel,i}, V_{ego}, i)$.

Step 830 may be followed by step 840 of constructing a differential equation that describes ego acceleration applied on the ego vehicle: $a=N*\Sigma f\theta(X_{rel,i}, V_{rel,i}, V_{ego}, i)$.

This may be the output of the inference process. Step 840 may be followed by step 450 (not shown).

The method may include updating the one or more network parameters.

The method may include step 860 of computing ego trajectory given initial conditions $\hat{X}(t; x_0, V_0)$.

Step 860 may be followed by step 870 of computing a loss function=$\Sigma(\hat{X}(t; x_0, V_0))-x(t; x_0, v_0))^2$. And propagating the loss accordingly.

FIG. 9 illustrates method 900 inference with the addition of a loss function for an adaptive cruise control model implemented with kinematic variables as inputs.

Step 910 of method 900 may include receiving a location of the ego vehicle $X_{ego}$, the speed of the ego vehicle $V_{ego}$, the location of the nearest vehicle in front of the ego vehicle $X_{CIPV}$, and the speed of the nearest vehicle in front of the ego vehicle $V_{CIPV}$.

Step 910 may be followed by step 920 of calculating the relative location $X_{rel}=X_{ego}-X_{CIPV}$, and the and the relative speed $V_{rel}=V_{ego}-V_{CIPV}$.

Step 920 may be followed by step 930 of:

Calculating, by a first NN, a perception field function $g\theta(X_{rel}, V_{CIPV})$.

Calculating, by a second NN, an auxiliary function $h_\psi(V_{rel})$.

Multiplying $g_\theta(X_{rel}, V_{CIPV})$ by $h_\psi(V_{rel})$ to provide a target acceleration (which equals the target force).

This may be the output of the inference process. Step 930 may be followed by step 450 (not shown).

The method may include updating the one or more NN parameters.

The method may include step 960 of computing ego trajectory given initial conditions $\hat{X}(t; x_0, v_0)$.

Step 960 may be followed by step 970 of computing a loss function=$\Sigma(\hat{X}(t; x_0, v_0))-x(t; X_0, v_0))^2$. And propagating the loss accordingly.

Force Feedback

A human driver (hereinafter-driver) may steer a vehicle in a problematic manner. The driver may drive the vehicle in violation of one or more traffic rules and/or drive the vehicle in a reckless manner and/or drive the vehicle in a dangerous manner and/or drive the vehicle in any other improper manner.

Examples of problematic driving may include failing to maintain a safe distance from other road users, ignoring one or more road users, driving in an aggressive manner, bypassing another road user when said bypass is forbidden, introducing unnecessary changes in the direction and/or the speed of the propagation of the vehicle, and the like.

There is provided a method for communicating with a driver of a vehicle—and especially providing a restraining force for inducing the driver to drive in a proper manner.

Figure 10:
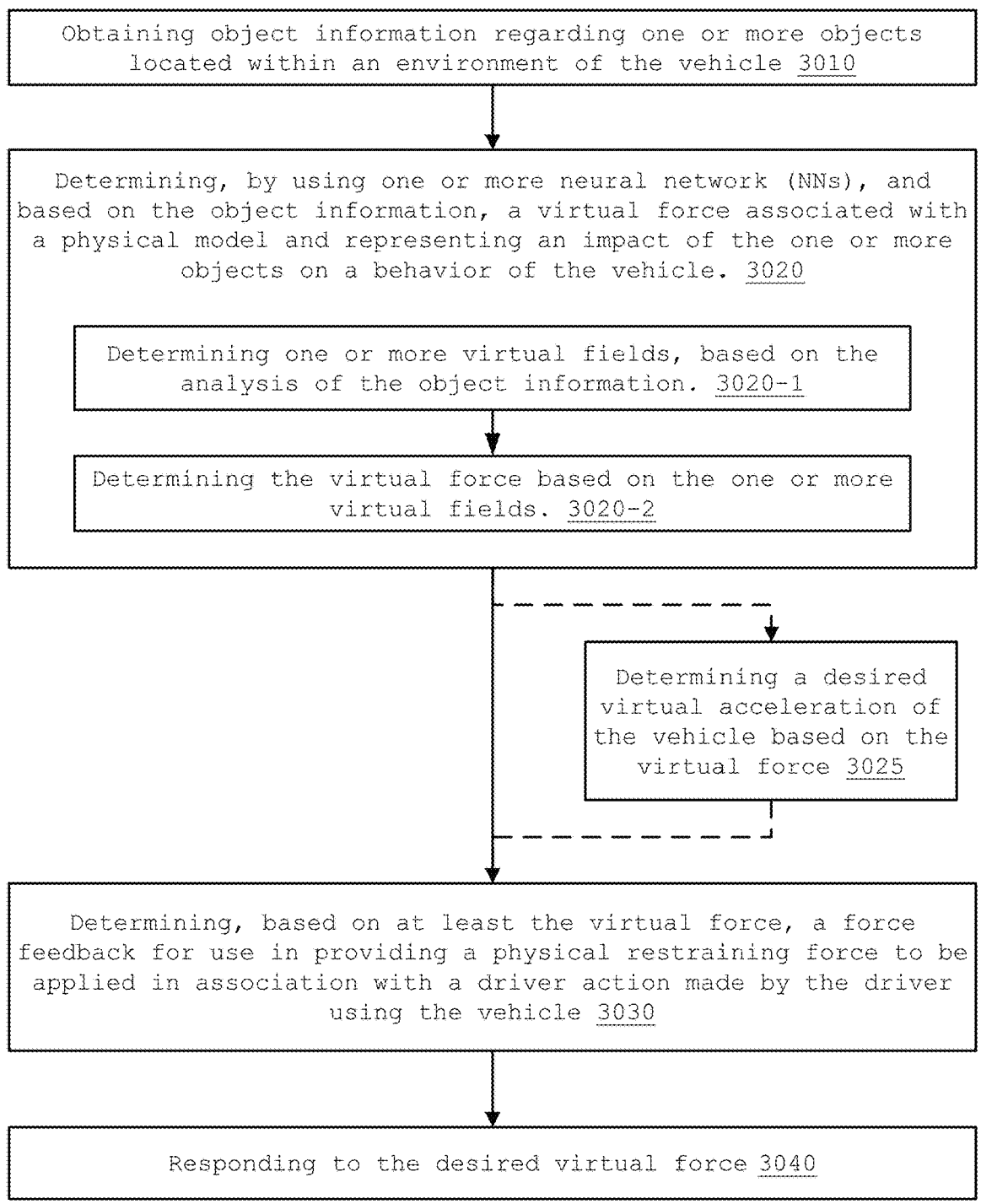
FIG. 10 illustrates an example of a method.

FIG. 10 illustrates an example of method 3000 for communication with a driver.

According to an embodiment, method 3000 starts by step 3010 of obtaining object information regarding one or more objects located within an environment of the vehicle.

According to an embodiment, step 3010 also includes analyzing the object information. The analysis may include determining location information and/or movement information of the one or more objects. The location information and the movement information may include the relative location of the one or more objects (in relation to the vehicle) and/or the relative movement of the one or more objects (in relation to the vehicle).

According to an embodiment, step 3010 is followed by step 3020 of determining, by using one or more neural network (NNs), and based on the object information, a virtual force associated with a physical model and representing an impact of the one or more objects on a behavior of the vehicle. The virtual force is virtually applied on the vehicle.

According to an embodiment, step 3020 includes step 3020-1 of determining one or more virtual fields, based on the object information, and step 3020-2 of determining of the virtual force based on the one or more virtual fields.

Step 3020 may be driven from the virtual physical model. For example—assuming that the virtual physical model represents objects as electromagnetic charges—the one or more virtual fields are virtual electromagnetic fields and the virtual force represents an electromagnetic force generated due to the virtual charges. For example—assuming that the virtual physical model is a mechanical model—then virtual force fields are driven from the acceleration of the objects.

According to an embodiment, step 3020 is followed by step 3030 of determining, based on at least the virtual force, a force feedback for use in providing a physical restraining force to be applied in association with a driver action made by the driver using the vehicle.

Step 3030 may be executed based on assumption regarding a relationship between the virtual force and a desired virtual acceleration of the vehicle. For example—the virtual force may have a virtual acceleration (that is virtually applied on the vehicle) and the desired virtual acceleration of the vehicle may counter the virtual acceleration that is virtually applied on the vehicle.

According to an embodiment, step 3020 is followed by step 3025 of determining the desired virtual acceleration of the vehicle based on the virtual acceleration. Step 3025 is followed by step 3030.

According to an embodiment—the desired virtual acceleration has a same magnitude as the virtually applied acceleration—but may be directed in an opposite direction.

According to an embodiment—the desired virtual acceleration has an magnitude that differs from the magnitude of the virtually applied acceleration.

According to an embodiment—the desired virtual acceleration has a direction that is not opposite to a direction of the virtually applied acceleration.

According to an embodiment, step 3030 includes at least one of:

Calculating a difference between the desired virtual acceleration and an acceleration of the vehicle to be set under a control of the driving operation of the driver.

Determining the force feedback by setting the physical restraining force to reduce the difference.

Determining one or more parameters of the force feedback. The one or more parameters may include magnitude and/or duration and/or manner of providing the force feedback. For example—the restraining force may be continuous or non-continuous, may be of a fixed magnitude or may have an magnitude that changes over time.

Determining an impact of the force feedback on an effort required by the driver to control a driving of the vehicle. A stronger restraining force may require the driver to increase his effort to overcome the restraining force.

Determining an impact of the force feedback on an effort required by the driver to turn a steering wheel of the vehicle.

Determining an impact of the force feedback on an effort required by the driver to change a velocity or an acceleration of the vehicle.

Determining the restraining force so that once the restraining force is applied it limits an impact of the driver action on the vehicle. For example—the driver is required to perform larger rotations of the steering wheel to cause the vehicle to perform the same change of direction.

Determining the restraining force so that once the restraining force is applied it prevents an impact of the driver action on the vehicle.

The determining the force feedback by setting the physical restraining force to reduce the difference may include applying any mapping between the value of the difference and one or more parameters of the restraining force.

For example—larger differences may trigger applying a stronger restraining force.

The relationship between the magnitude of the difference and the magnitude of the restraining force may be a linear relationship, a non-linear relationship, and the like.

Yet for another example—the duration and/or the duty cycle associated with the applying of the restraining force may change as a function of the difference.

According to an embodiment, step 3030 is followed by step 3040 of responding to the determining of the force feedback.

According to an embodiment, step 3040 includes at least one of:

Providing the force feedback in correspondence to the driver action made by the driver using the vehicle. The providing may include applying the restraining force. The applying of the restraining force may include performing a mechanical movement, changing a friction of a mechanical element, changing a mechanical transfer ratio, and the like.

Instructing a control unit of the vehicle to provide the force feedback in correspondence to the driver action made by the driver using the vehicle. The control unit may control one or more units of the vehicle such as a steering wheel, a gas pedal, a brake pedal, a throttle linkage, and the like.

Instructing a control unit of the vehicle to provide the force feedback in correspondence to the driver action made by the driver using the vehicle.

Triggering a provision of the force feedback upon identifying the driver action.

Taking control over the vehicle-transferring the control from the driver to an autonomous driving unit.

Figure 11:
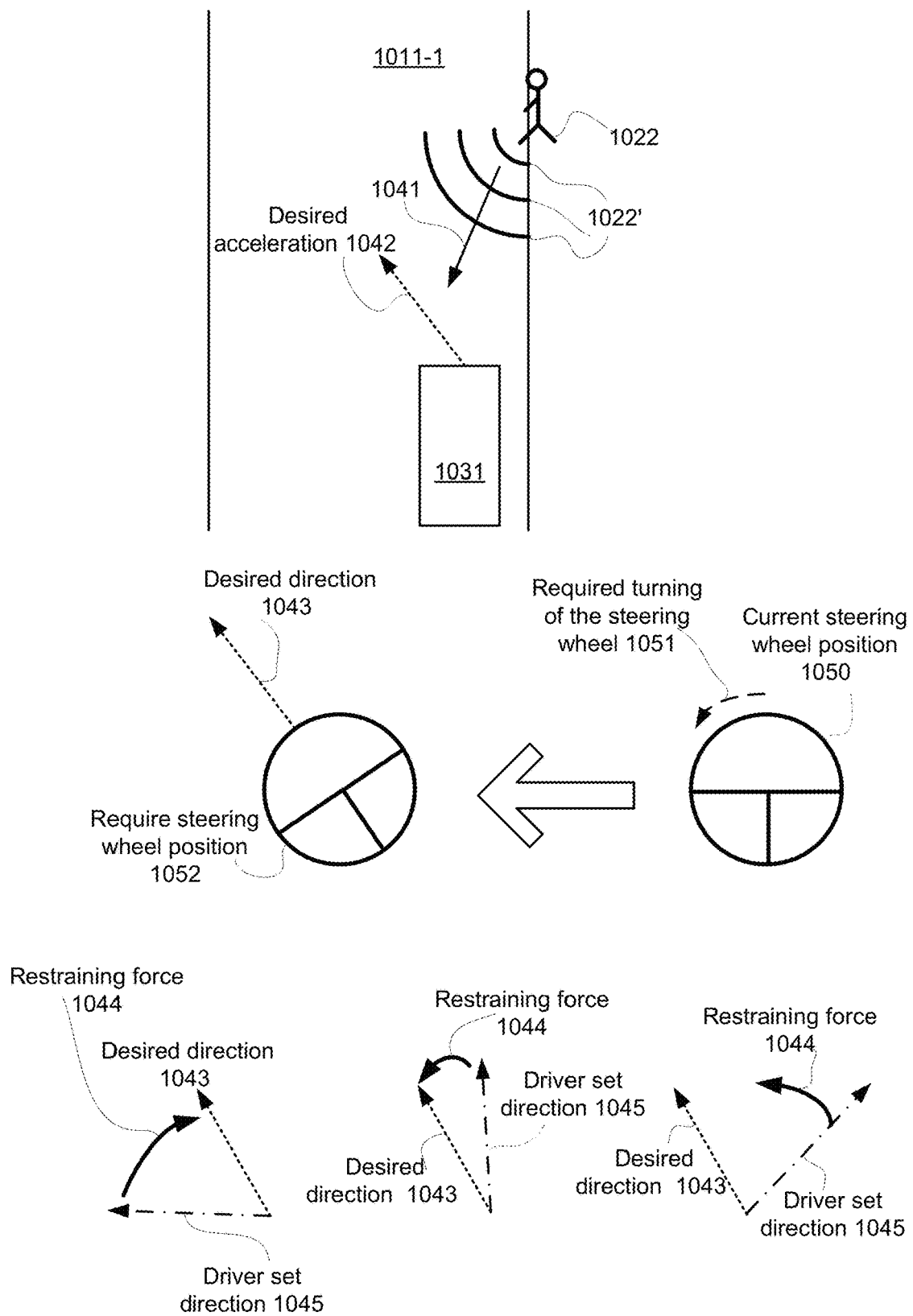
FIG. 11 illustrates an example of a scene.

FIG. 11 illustrates an example of a scene.

FIG. 11 illustrates an example of vehicle 1031 that is located within a segment 1011-1 of a first road.

A pedestrian 1022 starts crossing the segment—in front of the vehicle 1301. The pedestrian is represented by a pedestrian virtual field (illustrated by virtual equipotential field lines 1022' and directional vector 1041) that repels vehicle 1031.

FIG. 11 also illustrates the desired acceleration 1042 of the vehicle.

Assuming that before being subjected to the virtual forces—the vehicle moves in parallel to the boundaries of the road.

Under this assumption—the current steering position 1050 has to be changed—and the steering wheel has to be rotated (by a required turning of the steering wheel 1051) in order to steer the vehicle to the desired direction 1043 which is parallel to the direction of the desired acceleration.

FIG. 11 also illustrates three examples of unwanted differences between the desired direction (1043) and unwanted directions of propagation of the vehicle that are set by the driver. The unwanted directions are represented by dashed lines denoted "driver set direction" 1045.

In these three examples a restraining force 1044 is provided to reduce the difference—and set the vehicle to propagate according to the desired direction 1043.

In the foregoing specification, the invention has been described with reference to specific examples of embodiments of the invention. It will, however, be evident that various modifications and changes may be made therein without departing from the broader spirit and scope of the invention as set forth in the appended claims. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein. Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality. Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination. It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for communicating with a driver of a vehicle, the method comprising:
    obtaining object information regarding one or more objects located within an environment of the vehicle;
    analyzing the object information;
    determining, by using one or more neural network, and based on the object information, one or more virtual forces associated with a physical model and representing an impact of the one or more objects on a behavior of the vehicle;
    determining, by using one or more other neural networks, one or more perception fields that represent an electric field and are based on the analysis of the object information;
    determining one or more auxiliary functions representing one or more relative velocities between the vehicle and the one or more objects; and
    determining, based on at least the one or more perception fields and further in accordance with the one or more auxiliary functions, a force feedback for use in providing a physical restraining force to be applied in association with a driver action made by the driver using the vehicle, wherein the determining of the force feedback comprises-calculating a desired virtual acceleration of the vehicle by multiplying the one or more auxiliary functions by corresponding one or more perception fields;
    wherein the physical model represents the vehicle and the one or more objects as electromagnetic charges, wherein a virtual force of the one or more virtual forces is indicative of an electromagnetic force generated in reaction to the electromagnetic charges.

2. The method according to claim 1, comprising determining one or more virtual fields, based on the analysis of the object information, wherein the determining of the one or more virtual forces is based on the one or more virtual fields.

3. The method of claim 1, comprising providing the force feedback in correspondence to the driver action made by the driver using the vehicle.

4. The method of claim 1, comprising instructing a control unit of the vehicle to provide the force feedback in correspondence to the driver action made by the driver using the vehicle.

5. The method of claim 1, comprising triggering a providing of the force feedback upon identifying the driver action.

6. The method of claim 1, wherein the determining of the force feedback comprises determining an impact of the force feedback on an effort required by the driver to control a driving of the vehicle.

7. The method of claim 1, wherein the determining of the force feedback comprises determining an impact of the force feedback on an effort required by the driver to turn a steering wheel of the vehicle.

8. The method of claim 1, wherein the determining of the force feedback comprises determining an impact of the force feedback on an effort required by the driver to change a velocity or an acceleration of the vehicle.

9. The method according to claim 1, comprising calculating a desired virtual acceleration of the vehicle, based on the virtual force.

10. The method according to claim 9, comprising calculating a difference between the desired virtual acceleration and an acceleration of the vehicle to be set under a control of the driving operation of the driver.

11. The method according to claim 10, wherein the determining of the force feedback comprising setting the physical restraining force to reduce the difference.

12. The method according to claim 1, comprises determining a desired path of the vehicle, based on one or more iterations of determining of the virtual force.

13. The method according to claim 12, wherein the determining of the force feedback comprising setting the physical restraining force to reduce a difference between a path dictated by the driver and the desired path.

14. The method of claim 1, wherein parameters of the one or more perception fields and the one or more auxiliary fields are updated during reinforcement training to maximize expected accumulated rewards.

15. The method of claim 1, wherein parameters of the one or more perception fields and the one or more auxiliary fields are updated during behavioral cloning training to minimize a loss function.

16. The method according to claim 1, wherein the one or objects are multiple objects, wherein the one or more virtual forces are multiple virtual forces, and wherein the method further comprises calculating a desired virtual acceleration of the vehicle, by performing a vector weighted sum of the virtual forces.

17. The method according to claim 1, further comprising performing a driving related operation.

18. A non-transitory computer readable medium for communicating with a driver of a vehicle, the non-transitory computer readable medium stores instructions for:
- obtaining object information regarding one or more objects located within an environment of the vehicle;
- analyzing the object information;
- determining, by using one or more neural network, and based on the object information, a virtual force associated with a physical model and representing an impact of the one or more objects on a behavior of the vehicle; determining, by using one or more other neural networks, one or more perception fields that represent an electric field and are based on the analysis of the object information;
- determining one or more auxiliary functions representing one or more relative velocities between the vehicle and the one or more objects; and
- determining, based on at least the one or more perception fields and further in accordance with the one or more auxiliary functions, a force feedback for use in providing a physical restraining force to be applied in association with a driver action made by the driver using the vehicle, wherein the determining of the force feedback comprises calculating a desired virtual acceleration of the vehicle by multiplying the one or more auxiliary functions and corresponding one or more perception fields;
- wherein the physical model represents the vehicle an object of the one or more objects as electromagnetic charges, wherein a virtual force of the one or more virtual forces is indicative of an electromagnetic force generated in reaction to the electromagnetic charges.

19. The non-transitory computer readable medium according to claim 18, that stores instructions for comprising determining one or more virtual fields, based on the analysis of the object information, wherein the determining of the virtual force is based on the one or more virtual fields.

20. The non-transitory computer readable medium according to claim 19, that stores instructions for:
- calculating a desired virtual acceleration of the vehicle, based on the virtual force,
- calculating a difference between the desired virtual acceleration and an acceleration of the vehicle to be set under a control of the driving operation of the driver, and
- wherein the determining of the force feedback comprising setting the physical restraining force to reduce the difference.

* * * * *